(12) United States Patent
Meier et al.

(10) Patent No.: US 6,890,877 B2
(45) Date of Patent: May 10, 2005

(54) ENHANCED FLUID/SOLIDS CONTACTING IN A FLUIDIZATION REACTOR

(75) Inventors: Paul F. Meier, Bartlesville, OK (US); Edward L. Sughrue, Bartlesville, OK (US); Jan W. Wells, Bartlesville, OK (US); Douglas W. Hausler, Bartlesville, OK (US); Max W. Thompson, Sugar Land, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/191,930

(22) Filed: Jul. 9, 2002

(65) Prior Publication Data

US 2004/0007505 A1 Jan. 15, 2004

(51) Int. Cl.$^7$ .......................... B01J 20/00; B01J 23/00; B01J 21/00; B01J 23/60
(52) U.S. Cl. .................. 502/400; 502/253; 502/307; 502/329; 502/343
(58) Field of Search .................. 502/253, 307, 502/319, 321, 324, 329, 343, 400

(56) References Cited

U.S. PATENT DOCUMENTS

| | | | | |
|---|---|---|---|---|
| 4,636,371 A | * | 1/1987 | Farha, Jr. .............. | 423/244.1 |
| 5,094,996 A | * | 3/1992 | Kidd ...................... | 502/405 |
| 5,102,854 A | * | 4/1992 | Delzer et al. .......... | 502/410 |
| 5,116,940 A | | 5/1992 | Eisinger ................ | 528/483 |
| 5,370,848 A | * | 12/1994 | Delzer et al. .......... | 423/220 |
| 5,439,867 A | * | 8/1995 | Khare et al. ........... | 502/407 |
| 5,499,587 A | * | 3/1996 | Rodriquez et al. ..... | 110/342 |
| 5,656,243 A | | 8/1997 | Luckenbach et al. .. | 585/684 |
| 5,693,588 A | * | 12/1997 | Poston ................... | 502/400 |
| 5,726,117 A | * | 3/1998 | Khare et al. ........... | 502/400 |
| 5,776,331 A | * | 7/1998 | Khare et al. ........... | 208/247 |
| 5,914,288 A | * | 6/1999 | Turk et al. .............. | 502/38 |
| 5,914,424 A | | 6/1999 | Nakamura et al. ..... | 558/315 |
| 6,057,471 A | | 5/2000 | Nakamura et al. ..... | 558/321 |
| 6,184,176 B1 | | 2/2001 | Khare ................... | 502/407 |
| 6,254,766 B1 | | 7/2001 | Sughrue et al. ........ | 208/244 |
| 6,271,173 B1 | | 8/2001 | Khare ................... | 502/406 |
| 6,274,533 B1 | * | 8/2001 | Khare ................... | 502/343 |
| 6,306,793 B1 | * | 10/2001 | Turk et al. .............. | 502/216 |
| 6,429,170 B1 | * | 8/2002 | Dodwell ................ | 502/400 |
| 6,455,464 B1 | * | 9/2002 | Chen ..................... | 502/346 |
| 6,531,053 B2 | * | 3/2003 | Khare ................... | 208/208 R |
| 6,544,410 B1 | * | 4/2003 | Gislason et al. ........ | 208/247 |
| 6,635,792 B2 | * | 10/2003 | Choi et al. ............. | 585/489 |

OTHER PUBLICATIONS

Fogler, H. Scott, Elements of Chemical Reactor Engineering, Second Edition (Prentice Hall, 1992) pp. 765–770.

* cited by examiner

*Primary Examiner*—Cam N. Nguyen
(74) *Attorney, Agent, or Firm*—Lynda S. Jolly; Kameron D. Kelly

(57) ABSTRACT

A system for enhancing fluid/solids contacting in a fluidization reactor by controlling the particle size distribution of the solid particulates in the reactor.

22 Claims, 6 Drawing Sheets

ENHANCED FLUID/SOLIDS CONTACTING IN A FLUIDIZATION REACTOR

BACKGROUND OF THE INVENTION

This invention relates to a system for enhancing fluid/solids contacting in a fluidization reactor. In another aspect, the invention concerns a system for improving the contacting of a hydrocarbon-containing fluid stream and sulfur-sorbing solid particulates in a fluidized bed reactor. In yet another aspect, the invention concerns a method and apparatus for removing sulfur from hydrocarbon-containing fluid streams.

Hydrocarbon-containing fluids such as gasoline and diesel fuels typically contain a quantity of sulfur. High levels of sulfurs in such automotive fuels are undesirable because oxides of sulfur present in automotive exhaust may irreversibly poison noble metal catalysts employed in automobile catalytic converters. Emissions from such poisoned catalytic converters may contain high levels of non-combusted hydrocarbons, oxides of nitrogen, and/or carbon monoxide, which, when catalyzed by sunlight, form ground level ozone, more commonly referred to as smog.

Much of the sulfur present in the final blend of most gasolines originates from a gasoline blending component commonly known as "cracked-gasoline." Thus, reduction of sulfur levels in cracked-gasoline will inherently serve to reduce sulfur levels in most gasolines, such as, automobile gasolines, racing gasolines, aviation gasolines, boat gasolines, and the like. Many conventional processes exist for removing sulfur from cracked-gasoline. However, most conventional sulfur removal processes, such as hydrodesulfurization, tend to saturate olefins and aromatics in the cracked-gasoline and thereby reduce its octane number (both research and motor octane number). Thus, there is a need for a process wherein desulfurization of cracked-gasoline is achieved while the octane number is maintained.

In addition to the need for removing sulfur from cracked-gasoline, there is also a need to reduce the sulfur content in diesel fuel. In removing sulfur from diesel fuel by hydrodesulfurization, the cetane is improved but there is a large cost in hydrogen consumption. Such hydrogen is consumed by both hydrodesulfurization and aromatic hydrogenation reactions. Thus, there is a need for a process wherein desulfurization of diesel fuel is achieved without significant consumption of hydrogen so as to provide a more economical desulfurization process.

Traditionally, sorbent compositions used in processes for removing sulfur from hydrocarbon-containing fluids, such as cracked-gasoline and diesel fuel, have been agglomerates utilized in fixed bed applications. Because fluidized bed reactors present a number of advantages over fixed bed reactors, hydrocarbon-containing fluids are sometimes processed in fluidized bed reactors. Relative to fixed bed reactors, fluidized bed reactors have both advantages and disadvantages. Rapid mixing of solids gives nearly isothermal conditions throughout the reactor leading to reliable control of the reactor and, if necessary, easy removal of heat. Also, the flowability of the solid sorbent particulates allows the sorbent particulates to be circulated between two or more units, an ideal condition for reactors where the sorbent needs frequent regeneration. However, the gas flow in fluidized bed reactors is often difficult to describe, with possible large deviations from plug flow leading to gas bypassing, solids backmixing, and inefficient gas/solids contacting. Such undesirable flow characteristics within a fluidized bed reactor ultimately leads to a less efficient desulfurization process.

SUMMARY OF THE INVENTION

Accordingly, it is an object of the present invention to provide a novel system of solid sorbent particulates that are sized to enhance fluid/solids contacting in a fluidization reactor.

A further object of the present invention is to provide a novel hydrocarbon desulfurization system which employs a fluidized bed reactor having reactor internals which enhance the contacting of the hydrocarbon-containing fluid stream and the regenerable solid sorbent particulates, thereby enhancing desulfurization of the hydrocarbon-containing fluid stream.

A still further object of the present invention is to provide a hydrocarbon desulfurization system which minimizes octane loss and hydrogen consumption while providing enhanced sulfur removal.

It should be noted that the above-listed objects need not all be accomplished by the invention claimed herein and other objects and advantages of this invention will be apparent from the following description of the preferred embodiments and appended claims.

Accordingly, in one embodiment of the present invention, a sorbent system is presented which comprises a plurality of solid sorbent particulates having a mean particle size of less than about 70 microns and a fines content of at least about 10 weight percent. Each of the particulates comprises zinc oxide and a reduced-valence promoter metal component.

In a further embodiment of the present invention, a sorbent system is provided which comprises a plurality of solid sorbent particulates having a mean particle size of less than about 70 microns and a fines content of at least about 10 weight percent. Each of the particulates comprises zinc oxide, an aluminate, perlite, and a promoter metal component.

In a still further embodiment of the present invention, a desulfurization system is provided which comprises a fluidized bed reactor, a hydrocarbon-containing fluid stream, and a fluidized bed of reduced solid sorbent particulates. The hydrocarbon-containing fluid stream flows upwardly through a reaction zone defined by the reactor. The fluidized bed of reduced solid sorbent particulates is disposed in the reaction zone and is fluidized by the flow of the hydrocarbon-containing fluid stream therethrough. The reduced solid sorbent particulates have a mean particle size of less than about 70 microns and a fines content of at least about 10 weight percent.

In yet a further embodiment of the present invention, a desulfurization process is provided which comprises the steps of (a) contacting a hydrocarbon-containing fluid stream with solid sorbent particulates having a mean particle size of less than about 70 microns and a fines content of at least about 10 weight percent, thereby providing a desulfurized hydrocarbon and sulfur-loaded sorbent particulates; (b) contacting the sulfur-loaded sorbent particulates with an oxygen-containing regeneration stream, thereby providing regenerated sorbent particulates; and (c) contacting the regenerated sorbent particulates with a hydrogen-containing reducing stream, thereby providing reduced sorbent particulates.

DETAILED DESCRIPTION OF THE PREFERRED EMBODIMENTS

Figure 1:
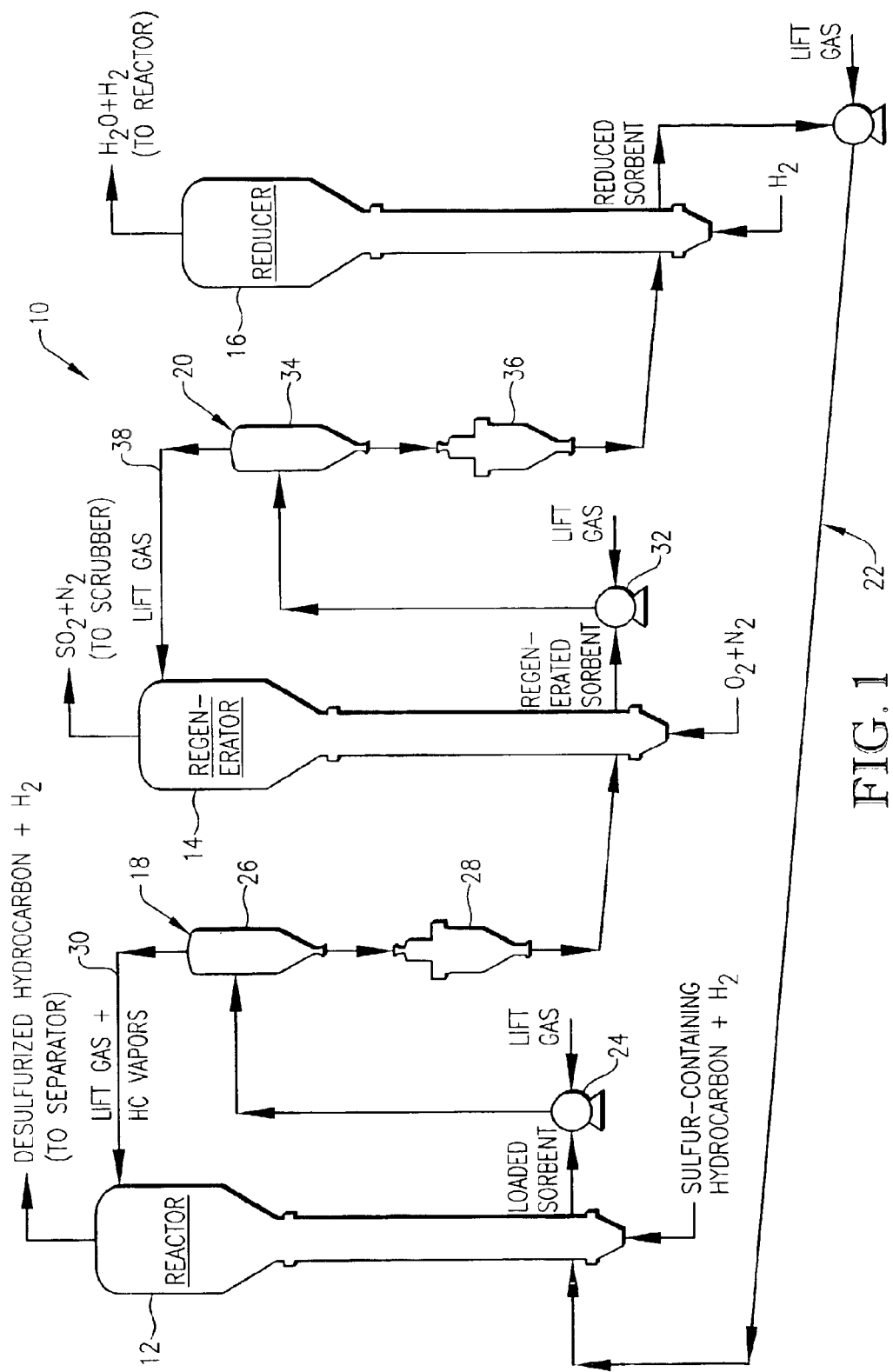
FIG. 1 is a schematic diagram of a desulfurization unit constructed in accordance with the principals of the present invention, particularly illustrating the circulation of regenerable solid sorbent particulates through the reactor, regenerator, and reducer.

Referring initially to FIG. 1, a desulfurization unit 10 is illustrated as generally comprising a fluidized bed reactor 12, a fluidized bed regenerator 14, and a fluidized bed reducer 16. Solid sorbent particulates are circulated in desulfurization unit 10 to provide for substantially continuous sulfur removal from a sulfur-containing hydrocarbon, such as cracked-gasoline or diesel fuel. The solid sorbent particulates employed in desulfurization unit 10 can be any sufficiently fluidizable, circulatable, and regenerable zinc oxide-based composition having sufficient desulfurization activity and sufficient attrition resistance. A description of such a sorbent composition is provided in U.S. patent application Ser. No. 09/580,611 and U.S. patent application Ser. No. 10/072,209, the entire disclosures of which are incorporated herein by reference.

In fluidized bed reactor 12, a hydrocarbon-containing fluid stream is passed upwardly through a bed of reduced solid sorbent particulates. The reduced solid sorbent particulates contacted with the hydrocarbon-containing stream in reactor 12 preferably initially (i.e., immediately prior to contacting with the hydrocarbon-containing fluid stream) comprise zinc oxide and a reduced-valence promoter metal component. Though not wishing to be bound by theory, it is believed that the reduced-valence promoter metal component of the reduced solid sorbent particulates facilitates the removal of sulfur from the hydrocarbon-containing stream, while the zinc oxide operates as a sulfur storage mechanism via its conversion to zinc sulfide.

The reduced-valence promoter metal component of the reduced solid sorbent particulates preferably comprises a promoter metal selected from a group consisting of nickel, cobalt, iron, manganese, tungsten, silver, gold, copper, platinum, zinc, tin, ruthenium, molybdenum, antimony, vanadium, iridium, chromium, palladium. More preferably, the reduced-valence promoter metal component comprises nickel as the promoter metal. As used herein, the term "reduced-valence" when describing the promoter metal component, shall denote a promoter metal component having a valence which is less than the valence of the promoter metal component in its common oxidized state. More specifically, the reduced solid sorbent particulates employed in reactor 12 should include a promoter metal component having a valence which is less than the valence of the promoter metal component of the regenerated (i.e., oxidized) solid sorbent particulates exiting regenerator 14. Most preferably, substantially all of the promoter metal component of the reduced solid sorbent particulates has a valence of zero.

In a preferred embodiment of the present invention, the reduced-valence promoter metal component comprises, consists of, or consists essentially of, a substitutional solid metal solution characterized by the formula: $M_A Zn_B$, wherein M is the promoter metal and A and B are each numerical values in the range of from 0.01 to 0.99. In the above formula for the substitutional solid metal solution, it is preferred for A to be in the range of from about 0.70 to about 0.97, and most preferably in the range of from about 0.85 to about 0.95. It is further preferred for B to be in the range of from about 0.03 to about 0.30, and most preferably in the range of from about 0.05 to 0.15. Preferably, B is equal to $(1-A)$.

Substitutional solid solutions have unique physical and chemical properties that are important to the chemistry of the sorbent composition described herein. Substitutional solid solutions are a subset of alloys that are formed by the direct substitution of the solute metal for the solvent metal atoms in the crystal structure. For example, it is believed that the substitutional solid metal solution $(M_A Zn_B)$ found in the reduced solid sorbent particulates is formed by the solute zinc metal atoms substituting for the solvent promoter metal atoms. There are three basic criteria that favor the formation of substitutional solid solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc oxide employed in the solid sorbent particulates described herein preferably meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 92:8 nickel zinc solid solution $(Ni_{0.92}Zn_{0.08})$ that is formed during reduction and microscopically in the repeated regenerability of the solid sorbent particulates.

In addition to zinc oxide and the reduced-valence promoter metal component, the reduced solid sorbent particulates employed in reactor 12 may further comprise a porosity enhancer and an aluminate. The aluminate is preferably a promoter metal-zinc aluminate substitutional solid solution. The promoter metal-zinc aluminate substitutional solid solution can be characterized by the formula: $M_ZZn_{(1-Z)}Al_2O_4$, wherein Z is a numerical value in the range of from 0.01 to 0.99. The porosity enhancer, when employed, can be any compound which ultimately increases the macroporosity of the solid sorbent particulates. Preferably, the porosity enhancer is perlite. The term "perlite" as used herein is the petrographic term for a siliceous volcanic rock which naturally occurs in certain regions throughout the world. The distinguishing feature, which sets it apart from other volcanic minerals, is its ability to expand four to twenty times its original volume when heated to certain temperatures. When heated above 1600° F., crushed perlite expands due to the presence of combined water with the crude perlite rock. The combined water vaporizes during the heating process and creates countless tiny bubbles in the heat softened glassy particles. It is these diminutive glass sealed bubbles which account for its light weight. Expanded perlite can be manufactured to weigh as little as 2.5 lbs per cubic foot. Typical chemical analysis properties of expanded perlite are: silicon dioxide 73%, aluminum oxide 17%, potassium oxide 5%, sodium oxide 3%, calcium oxide 1%, plus trace elements. Typical physical properties of expanded perlite are: softening point 1,600–2,000° F., fusion point 2,300° F.–2,450° F., pH 6.6–6.8, and specific gravity 2.2–2.4 The term "expanded perlite" as used herein refers to the spherical form of perlite which has been expanded by heating the perlite siliceous volcanic rock to a temperature above 1,600° F. The term "particulate expanded perlite" or "milled perlite" as used herein denotes that form of expanded perlite which has been subjected to crushing so as to form a particulate mass wherein the particle size of such mass is comprised of at least 97% of particles having a size of less than two microns. The term "milled expanded perlite" is intended to mean the product resulting from subjecting expanded perlite particles to milling or crushing.

The reduced solid sorbent particulates initially contacted with the hydrocarbon-containing fluid stream in reactor 12 can comprise zinc oxide, the reduced-valence promoter metal component ($M_AZn_B$), the porosity enhancer (PE), and the promoter metal-zinc aluminate ($M_ZZn_{(1-Z)}Al_2O_4$) in the ranges provided below in Table 1.

TABLE 1

Components of the Reduced Solid Sorbent Particulates

| Range | ZnO (wt %) | $M_AZn_B$ (wt %) | PE (wt %) | $M_ZZn_{(1-Z)}Al_2O_4$ (wt %) |
|---|---|---|---|---|
| Preferred | 5–80 | 5–80 | 2–50 | 1–50 |
| More Preferred | 20–60 | 20–60 | 5–30 | 5–30 |
| Most Preferred | 30–50 | 30–40 | 10–20 | 10–20 |

The physical properties of the solid sorbent particulates which significantly affect the particulates' suitability for use in desulfurization unit 10 include, for example, particle shape, particle size, particle density, and resistance to attrition. In particular, it has been discovered that proper control of the particle size distribution of the solid sorbent particulates can enhance fluid/solids contacting in fluidized bed reactor 12 by reducing axial dispersion in reactor 12. The solid sorbent particulates employed in desulfurization unit 10 preferably comprise finely divided, spray-dried, substantially microspherical particles having a mean particle size that is less than about 70 microns, more preferably less than about 65 microns, and most preferably less than about 60 microns. The mean particle size of the solid sorbent particulates is preferably in the range of from about 50 to about 65 microns, more preferably in the range of about 55 to about 62 microns. It is further preferred, for the fines content (i.e., the weight percent of less than 40 micron particles) of the solid sorbent particulates to be at least about 10 weight percent, more preferably at least about 15 weight percent, and most preferably at least 18 weight percent.

The density of the solid sorbent particulates is preferably in the range of from about 0.5 to about 1.5 grams per cubic centimeter (g/cc), more preferably in the range of from about 0.8 to about 1.3 g/cc, and most preferably in the range of from 0.9 to 1.2 g/cc. The particle size and density of the solid sorbent particulates preferably qualify the solid sorbent particulates as a Group A solid under the Geldart group classification system described in *Powder Technol.*, 7, 285–292 (1973). The solid sorbent particulates preferably have high resistance to attrition. As used herein, the term "attrition resistance" denotes a measure of a particle's resistance to size reduction under controlled conditions of turbulent motion. The attrition resistance of a particle can be quantified using the Davidson Index. The Davidson Index represents the weight percent of the over 20 micrometer particle size fraction which is reduced to particle sizes of less than 20 micrometers under test conditions. The Davidson Index is measured using a jet cup attrition determination method. The jet cup attrition determination method involves screening a five gram sample of sorbent to remove particles in the zero to 20 micrometer size range. The particles above 20 micrometers are then subjected to a tangential jet of air at a rate of 21 liters per minute introduced through a 0.0625 inch orifice fixed at the bottom of a specially designed jet cup (1" I.D.×2" height) for a period of 1 hour. The Davidson Index (DI) is calculated as follows:

$$DI = \frac{\text{Wt. of 0–20 Micrometer Formed During Test}}{\text{Wt. of Original + 20 Micrometer Fraction Being Tested}} \times 100 \times \text{Correction Factor}$$

The correction factor (presently 0.30) is determined by using a known calibration standard to adjust for differences in jet cup dimensions and wear.

The solid sorbent particulates employed in the present invention preferably have a Davidson Index value of less than about 30, more preferably less than about 20, and most preferably less than 10.

The hydrocarbon-containing fluid stream contacted with the reduced solid sorbent particulates in reactor 12 preferably comprises a sulfur-containing hydrocarbon and hydrogen. The molar ratio of the hydrogen to the sulfur-containing hydrocarbon charged to reactor 12 is preferably in the range of from about 0.1:1 to about 3:1, more preferably in the range of from about 0.2:1 to about 1:1, and most preferably in the range of from 0.4:1 to 0.8:1. Preferably, the sulfur-containing hydrocarbon is a fluid which is normally in a liquid state at standard temperature and pressure, but which exists in a gaseous state when combined with hydrogen, as described above, and exposed to the desulfurization conditions in reactor 12. The sulfur-containing hydrocarbon preferably can be used as a fuel or a precursor to fuel. Examples of suitable sulfur-containing hydrocarbons include cracked-gasoline, diesel fuels, jet fuels, straight-run naphtha, straight-run distillates, coker gas oil, coker naphtha, alkylates, and straight-run gas oil. Most preferably, the sulfur-containing hydrocarbon comprises a hydrocarbon fluid selected from the group consisting of gasoline, cracked-gasoline, diesel fuel, and mixtures thereof.

As used herein, the term "gasoline" denotes a mixture of hydrocarbons boiling in a range of from about 100° F. to about 400° F., or any fraction thereof. Examples of suitable gasolines include, but are not limited to, hydrocarbon streams in refineries such as naphtha, straight-run naphtha, coker naphtha, catalytic gasoline, visbreaker naphtha, alkylates, isomerate, reformate, and the like, and mixtures thereof.

As used herein, the term "cracked-gasoline" denotes a mixture of hydrocarbons boiling in a range of from about 100° F. to about 400° F., or any fraction thereof, that are products of either thermal or catalytic processes that crack larger hydrocarbon molecules into smaller molecules. Examples of suitable thermal processes include, but are not limited to, coking, thermal cracking, visbreaking, and the like, and combinations thereof. Examples of suitable catalytic cracking processes include, but are not limited to, fluid catalytic cracking, heavy oil cracking, and the like, and combinations thereof. Thus, examples of suitable cracked-gasolines include, but are not limited to, coker gasoline, thermally cracked gasoline, visbreaker gasoline, fluid catalytically cracked gasoline, heavy oil cracked-gasoline and the like, and combinations thereof In some instances, the cracked-gasoline may be fractionated and/or hydrotreated prior to desulfurization when used as the sulfur-containing fluid in the process in the present invention.

As used herein, the term "diesel fuel" denotes a mixture of hydrocarbons boiling in a range of from about 300° F. to about 750° F., or any fraction thereof. Examples of suitable diesel fuels include, but are not limited to, light cycle oil, kerosene, jet fuel, straight-run diesel, hydrotreated diesel, and the like, and combinations thereof.

The sulfur-containing hydrocarbon described herein as suitable feed in the inventive desulfurization process comprises a quantity of olefins, aromatics, and sulfur, as well as paraffins and naphthenes. The amount of olefins in gaseous cracked-gasoline is generally in a range of from about 10 to about 35 weight percent olefins based on the total weight of the gaseous cracked-gasoline. For diesel fuel there is essentially no olefin content. The amount of aromatics in gaseous cracked-gasoline is generally in a range of from about 20 to about 40 weight percent aromatics based on the total weight of the gaseous cracked-gasoline. The amount of aromatics in gaseous diesel fuel is generally in a range of from about 10 to about 90 weight percent aromatics based on the total weight of the gaseous diesel fuel. The amount of atomic sulfur in the sulfur-containing hydrocarbon fluid, preferably cracked-gasoline or diesel fuel, suitable for use in the inventive desulfurization process is generally greater than about 50 parts per million by weight (ppmw) of the sulfur-containing hydrocarbon fluid, more preferably in a range of from about 100 ppmw atomic sulfur to about 10,000 ppmw atomic sulfur, and most preferably from 150 ppmw atomic sulfur to 500 ppmw atomic sulfur. It is preferred for at least about 50 weight percent of the atomic sulfur present in the sulfur-containing hydrocarbon fluid employed in the present invention to be in the form of organosulfur compounds. More preferably, at least about 75 weight percent of the atomic sulfur present in the sulfur-containing hydrocarbon fluid is in the form of organosulfur compounds, and most preferably at least 90 weight percent of the atomic sulfur is in the form of organosulfur compounds. As used herein, "sulfur" used in conjunction with "ppmw sulfur" or the term "atomic sulfur", denotes the amount of atomic sulfur (about 32 atomic mass units) in the sulfur-containing hydrocarbon, not the atomic mass, or weight, of a sulfur compound, such as an organosulfur compound.

As used herein, the term "sulfur" denotes sulfur in any form normally present in a sulfur-containing hydrocarbon such as cracked-gasoline or diesel fuel. Examples of such sulfur which can be removed from a sulfur-containing hydrocarbon fluid through the practice of the present invention include, but are not limited to, hydrogen sulfide, carbonal sulfide (COS), carbon disulfide ($CS_2$), mercaptans (RSH), organic sulfides (R—S—R), organic disulfides (R—S—S—R), thiophene, substitute thiophenes, organic trisulfides, organic tetrasulfides, benzothiophene, alkyl thiophenes, alkyl benzothiophenes, alkyl dibenzothiophenes, and the like, and combinations thereof, as well as heavier molecular weights of the same which are normally present in sulfur-containing hydrocarbons of the types contemplated for use in the desulfurization process of the present invention, wherein each R can by an alkyl, cycloalkyl, or aryl group containing one to 10 carbon atoms.

As used herein, the term "fluid" denotes gas, liquid, vapor, and combinations thereof.

As used herein, the term "gaseous" denotes the state in which the sulfur-containing hydrocarbon fluid, such as cracked-gasoline or diesel fuel, is primarily in a gas or vapor phase.

In fluidized bed reactor 12, the finely divided reduced solid sorbent particulates are contacted with the upwardly flowing gaseous hydrocarbon-containing fluid stream under a set of desulfurization conditions sufficient to produce a desulfurized hydrocarbon and sulfur-loaded solid sorbent particulates. The flow of the hydrocarbon-containing fluid stream is sufficient to fluidize the bed of solid sorbent particulates located in reactor 12. The desulfurization conditions in reactor 12 include temperature, pressure, weighted hourly space velocity (WHSV), and superficial velocity. The preferred ranges for such desulfurization conditions are provided below in Table 2.

TABLE 2

| | Desulfurization Conditions | | | |
|---|---|---|---|---|
| Range | Temp (° F.) | Press. (psig) | WHSV ($hr^{-1}$) | Superficial Vel. (ft/s) |
| Preferred | 250–1200 | 25–750 | 1–20 | 0.25–5 |
| More Preferred | 500–1000 | 100–400 | 2–12 | 0.5–2.5 |
| Most Preferred | 700–850 | 150–250 | 3–8 | 1.0–1.5 |

When the reduced solid sorbent particulates are contacted with the hydrocarbon-containing stream in reactor 12 under desulfurization conditions, sulfur compounds, particularly organosulfur compounds, present in the hydrocarbon-containing fluid stream are removed from such fluid stream. At least a portion of the sulfur removed from the hydrocarbon-containing fluid stream is employed to convert at least a portion of the zinc oxide of the reduced solid sorbent particulates into zinc sulfide.

In contrast to many conventional sulfur removal processes (e.g., hydrodesulfurization), it is preferred that substantially none of the sulfur in the sulfur-containing hydrocarbon fluid is converted to, and remains as, hydrogen sulfide during desulfurization in reactor 12. Rather, it is preferred that the fluid effluent from reactor 12 (generally comprising the desulfurized hydrocarbon and hydrogen) comprises less than the amount of hydrogen sulfide, if any, in the fluid feed charged to reactor 12 (generally comprising the sulfur-containing hydrocarbon and hydrogen). The fluid effluent from reactor 12 preferably contains less than about 50 weight percent of the amount of sulfur in the fluid feed charged to reactor 12, more preferably less than about 20 weight percent of the amount of sulfur in the fluid feed, and most preferably less than five weight percent of the amount of sulfur in the fluid feed. It is preferred for the total sulfur content of the fluid effluent from reactor 12 to be less than about 50 parts per million by weight (ppmw) of the total fluid effluent, more preferably less than about 30 ppmw, still more preferably less than about 15 ppmw, and most preferably less than 10 ppmw.

After desulfurization in reactor 12, the desulfurized hydrocarbon fluid, preferably desulfurized cracked-gasoline or desulfurized diesel fuel, can thereafter be separated and recovered from the fluid effluent and preferably liquefied. The liquification of such desulfurized hydrocarbon fluid can be accomplished by any method or manner known in the art. The resulting liquified, desulfurized hydrocarbon preferably comprises less than about 50 weight percent of the amount of sulfur in the sulfur-containing hydrocarbon (e.g., cracked-gasoline or diesel fuel) charged to the reaction zone, more preferably less than about 20 weight percent of the amount of sulfur in the sulfur-containing hydrocarbon, and most preferably less than five weight percent of the amount of sulfur in the sulfur-containing hydrocarbon. The desulfurized hydrocarbon preferably comprises less than about 50 ppmw sulfur, more preferably less than about 30 ppmw sulfur, still more preferably less than about 15 ppmw sulfur, and most preferably less than 10 ppmw sulfur.

After desulfurization in reactor 12, at least a portion of the sulfur-loaded sorbent particulates are transported to regenerator 14 via a first transport assembly 18. In regenerator 14, the sulfur-loaded solid sorbent particulates are contacted with an oxygen-containing regeneration stream. The oxygen-containing regeneration stream preferably comprises at least one mole percent oxygen with the remainder being a gaseous diluent. More preferably, the oxygen-containing regeneration stream comprises in the range of from about one to about 50 mole percent oxygen and in the range of from about 50 to about 95 mole percent nitrogen, still more preferable in the range of from about two to about 20 mole percent oxygen and in the range of from about 70 to about 90 mole percent nitrogen, and most preferably in the range of from three to 10 mole percent oxygen and in the range of from 75 to 85 mole percent nitrogen.

The regeneration conditions in regenerator 14 are sufficient to convert at least a portion of the zinc sulfide of the sulfur-loaded solid sorbent particulates into zinc oxide via contacting with the oxygen-containing regeneration stream. The preferred ranges for such regeneration conditions are provided below in Table 3.

TABLE 3

| | Regeneration Conditions | | |
|---|---|---|---|
| Range | Temp (° F.) | Press. (psig) | Superficial Vel. (ft/s) |
| Preferred | 500–1500 | 10–250 | 0.5–10 |
| More Preferred | 700–1200 | 20–150 | 1.0–5.0 |
| Most Preferred | 900–1100 | 30–75 | 2.0–2.5 |

When the sulfur-loaded solid sorbent particulates are contacted with the oxygen-containing regeneration stream under the regeneration conditions described above, at least a portion of the promoter metal component is oxidized to form an oxidized promoter metal component. Preferably, in regenerator 14 the substitutional solid metal solution ($M_AZn_B$) and/or sulfided substitutional solid metal solution ($M_AZn_BS$) of the sulfur-loaded sorbent is converted to a substitutional solid metal oxide solution characterized by the formula: $M_XZn_YO$, wherein M is the promoter metal and X and Y are each numerical values in the range of from 0.01 to about 0.99. In the above formula, it is preferred for X to be in the range of from about 0.5 to about 0.9 and most preferably from 0.6 to 0.8. It is further preferred for Y to be in the range of from about 0.1 to about 0.5, and most preferably from 0.2 to 0.4. Preferably, Y is equal to (1−X).

The regenerated solid sorbent particulates exiting regenerator 14 can comprise zinc oxide, the oxidized promoter metal component ($M_XZn_YO$), the porosity enhancer (PE), and the promoter metal-zinc aluminate ($M_ZZn_{(1-Z)}Al_2O_4$) in the ranges provided below in Table 4.

TABLE 4

| Components of the Regenerated Solid Sorbent Particulates | | | | |
|---|---|---|---|---|
| Range | ZnO (wt %) | $M_XZn_YO$ (wt %) | PE (wt %) | $M_ZZn_{(1-Z)}Al_2O_4$ (wt %) |
| Preferred | 5–80 | 5–70 | 2–50 | 1–50 |
| More Preferred | 20–60 | 15–60 | 5–30 | 5–30 |
| Most Preferred | 30–50 | 30–40 | 10–20 | 10–20 |

After regeneration in regenerator 14, the regenerated (i.e., oxidized) solid sorbent particulates are transported to reducer 16 via a second transport assembly 20. In reducer 16, the regenerated solid sorbent particulates are contacted with a hydrogen-containing reducing stream. The hydrogen-containing reducing stream preferably comprises at least about 50 mole percent hydrogen with the remainder being cracked hydrocarbon products such as, for example, methane, ethane, and propane. More preferably, the hydrogen-containing reducing stream comprises about 70 mole percent hydrogen, and most preferably at least 80 mole percent hydrogen. The reducing conditions in reducer 16 are sufficient to reduce the valence of the oxidized promoter metal component of the regenerated solid sorbent particulates. The preferred ranges for such reducing conditions are provided below in Table 5.

TABLE 5

| | Reducing Conditions | | |
|---|---|---|---|
| Range | Temp (° F.) | Press. (psig) | Superficial Vel. (ft/s) |
| Preferred | 250–1250 | 25–750 | 0.1–4.0 |
| More Preferred | 600–1000 | 100–400 | 0.2–2.0 |
| Most Preferred | 750–850 | 150–250 | 0.3–1.0 |

When the regenerated solid sorbent particulates are contacted with the hydrogen-containing reducing stream in reducer 16 under the reducing conditions described above, at least a portion of the oxidized promoter metal component is reduced to form the reduced-valence promoter metal component. Preferably, at least a substantial portion of the substitutional solid metal oxide solution ($M_XZn_YO$) is converted to the reduced-valence promoter metal component ($M_AZn_B$).

After the solid sorbent particulates have been reduced in reducer 16, they can be transported back to reactor 12 via a third transport assembly 22 for recontacting with the hydrocarbon-containing fluid stream in reactor 12.

Referring again to FIG. 1, first transport assembly 18 generally comprises a reactor pneumatic lift 24, a reactor receiver 26, and a reactor lockhopper 28 fluidly disposed between reactor 12 and regenerator 14. During operation of desulfurization unit 10 the sulfur-loaded sorbent particulates are continuously withdrawn from reactor 12 and lifted by reactor pneumatic lift 24 from reactor 12 to reactor receiver 18. Reactor receiver 18 is fluidly coupled to reactor 12 via a reactor return line 30. The lift gas used to transport the sulfur-loaded sorbent particulates from reactor 12 to reactor receiver 26 is separated from the sulfur-loaded sorbent particulates in reactor receiver 26 and returned to reactor 12 via reactor return line 30. Reactor lockhopper 26 is operable to transition the sulfur-loaded sorbent particulates from the high pressure hydrocarbon environment of reactor 12 and reactor receiver 26 to the low pressure oxygen environment of regenerator 14. To accomplish this transition, reactor lockhopper 28 periodically receives batches of the sulfur-loaded sorbent particulates from reactor receiver 26, isolates the sulfur-loaded sorbent particulates from reactor receiver 26 and regenerator 14, and changes the pressure and composition of the environment surrounding the sulfur-loaded sorbent particulates from a high pressure hydrocarbon environment to a low pressure inert (e.g., nitrogen) environment. After the environment of the sulfur-loaded sorbent particulates has been transitioned, as described above, the sulfur-loaded sorbent particulates are batch-wise transported from reactor lockhopper 28 to regenerator 14. Because the sulfur-loaded solid particulates are continuously withdrawn from reactor 12 but processed in a batch mode in reactor lockhopper 28, reactor receiver 26 functions as a surge vessel wherein the sulfur-loaded sorbent particulates continuously withdrawn from reactor 12 can be accumulated between transfers of the sulfur-loaded sorbent particulates from reactor receiver 26 to reactor lockhopper 28. Thus, reactor receiver 26 and reactor lockhopper 28 cooperate to transition the flow of the sulfur-loaded sorbent particulates between reactor 12 and regenerator 14 from a continuous mode to a batch mode.

Second transport assembly 20 generally comprises a regenerator pneumatic lift 32, a regenerator receiver 34, and a regenerator lockhopper 36 fluidly disposed between regenerator 14 and reducer 16. During operation of desulfurization unit 10 the regenerated sorbent particulates are continuously withdrawn from regenerator 14 and lifted by regenerator pneumatic lift 32 from regenerator 14 to regenerator receiver 34. Regenerator receiver 34 is fluidly coupled to regenerator 14 via a regenerator return line 38. The lift gas used to transport the regenerated sorbent particulates from regenerator 14 to regenerator receiver 34 is separated from the regenerated sorbent particulates in regenerator receiver 34 and returned to regenerator 14 via regenerator return line 38. Regenerator lockhopper 36 is operable to transition the regenerated sorbent particulates from the low pressure oxygen environment of regenerator 14 and regenerator receiver 34 to the high pressure hydrogen environment of reducer 16. To accomplish this transition, regenerator lockhopper 36 periodically receives batches of the regenerated sorbent particulates from regenerator receiver 34, isolates the regenerated sorbent particulates from regenerator receiver 34 and reducer 16, and changes the pressure and composition of the environment surrounding the regenerated sorbent particulates from a low pressure oxygen environment to a high pressure hydrogen environment. After the environment of the regenerated sorbent particulates has been transitioned, as described above, the regenerated sorbent particulates are batch-wise transported from regenerator lockhopper 36 to reducer 16. Because the regenerated sorbent particulates are continuously withdrawn from regenerator 14 but processed in a batch mode in regenerator lockhopper 36, regenerator receiver 34 functions as a surge vessel wherein the sorbent particulates continuously withdrawn from regenerator 14 can be accumulated between transfers of the regenerated sorbent particulates from regenerator receiver 34 to regenerator lockhopper 36. Thus, regenerator receiver 34 and regenerator lockhopper 36 cooperate to transition the flow of the regenerated sorbent particulates between regenerator 14 and reducer 16 from a continuous mode to a batch mode.

Figure 2:
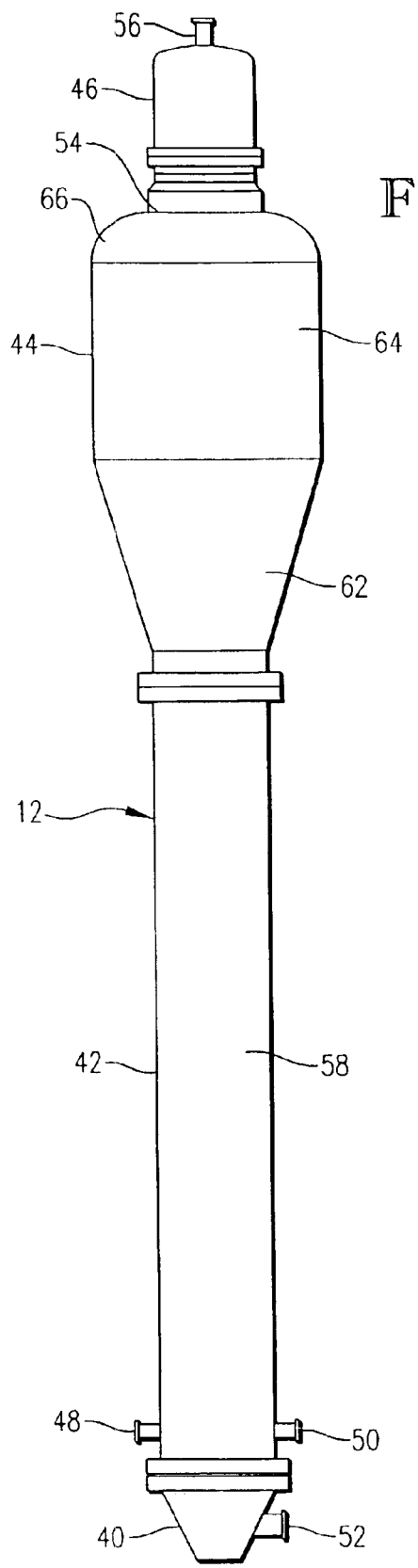
FIG. 2 is a side view of a fluidized bed reactor constructed in accordance with the principals of the present invention.

Referring now to FIG. 2, fluidized bed reactor 12 is illustrated as generally comprising a plenum 40, a reactor section 42, a disengagement section 44, and a solids filter 46. The reduced solid sorbent particulates are provided to reactor 12 via a solids inlet 48 in reactor section 42. The sulfur-loaded solid sorbent particulates are withdrawn from reactor 12 via a solids outlet 50 in reactor section 42. The hydrocarbon-containing fluid stream is charged to reactor 12 via a fluid inlet 52 in plenum 40. Once in reactor 12, the hydrocarbon-containing fluid stream flows upwardly through reactor section 42 (where it contacts and fluidizes the sorbent particulates) and disengagement section 44 (where it is substantially separated from the sorbent particulates) and exits a fluid outlet 54 in the upper portion of disengagement section 44. Filter 46 is received in fluid outlet 54 and extends at least partially into the interior of disengagement section 44. Filter 46 is operable to allow fluids to pass through fluid outlet 54 while substantially blocking the flow of any solid sorbent particulates through fluid outlet 54. The fluid (typically a desulfurized hydrocarbon and hydrogen) that flows through fluid outlet 54 exits filter 46 via a filter outlet 56.

Figure 3:
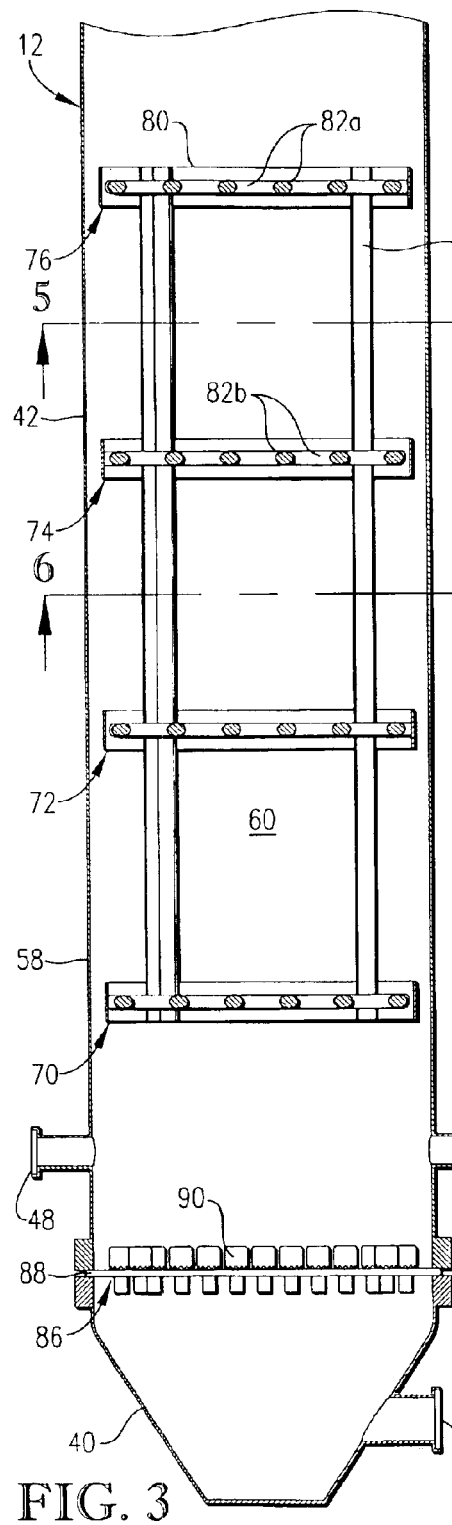
FIG. 3 is a partial sectional side view of the fluidized bed reactor, particularly illustrating a series of vertically spaced contact enhancing baffle groups disposed in the reaction zone.

Referring to FIGS. 2 and 3, reactor section 42 includes a substantially cylindrical reactor section wall 58 which defines an elongated, upright, substantially cylindrical reaction zone 60 within reactor section 42. Reaction zone 60 preferably has a height in the range of from about 10 to about 150 feet, more preferably in the range of from about 25 to about 75 feet, and most preferably in the range of from 35 to 55 feet. Reaction zone 60 preferably has a width (i.e., diameter) in the range of from about 1 to about 10 feet, more preferably in the range of from about 3 to about 8 feet, and most preferably in the range of from 4 to 5 feet. The ratio of the height of reaction zone 60 to the width (i.e., diameter) of reaction zone 60 is preferably in the range of from about 2:1 to about 15:1, more preferably in the range of from about 3:1 to about 10:1, and most preferably in the range of from about 4:1 to about 8:1. In reaction zone 60, the upwardly flowing fluid is passed through solid particulates to thereby create a fluidized bed of solid particulates. It is preferred for the resulting fluidized bed of solid particulates to be substantially contained within reaction zone 60. The ratio of the height of the fluidized bed to the width of the fluidized bed is preferably in the range of from about 1:1 to about 10:1, more preferably in the range of from about 2:1 to about 7:1, and most preferably in the range of from 2.5:1 to 5:1. The density of the fluidized bed is preferably in the range of from about 20 to about 60 $lb/ft^3$, more preferably in the range of from about 30 to about 50 $lb/ft^3$, and most preferably in the range of from about 35 to 45 $lb/ft^3$.

Referring again to FIG. 2, disengagement section 44 generally includes a generally frustoconical lower wall 62, a generally cylindrical mid-wall 64, and an upper cap 66. Disengagement section 44 defines a disengagement zone within reactor 12. It is preferred for the cross-sectional area of disengagement section 44 to be substantially greater than the cross-sectional area of reactor section 42 so that the velocity of the fluid flowing upwardly through reactor 12 is substantially lower in disengagement section 44 than in reactor section 42, thereby allowing solid particulates entrained in the upwardly flowing fluid to "fall out" of the fluid in the disengagement zone due to gravitational force. It is preferred for the maximum cross-sectional area of the disengagement zone defined by disengagement section 44 to be in the range of from about two to about ten times greater than the maximum cross-sectional area of reaction zone 60, more preferably in the range of from about three to about six times greater than the maximum cross-sectional area of reaction zone 60, and most preferably in the range of from 3.5 to 4.5 times greater than the maximum cross-sectional area in reaction zone 60.

Figure 4:
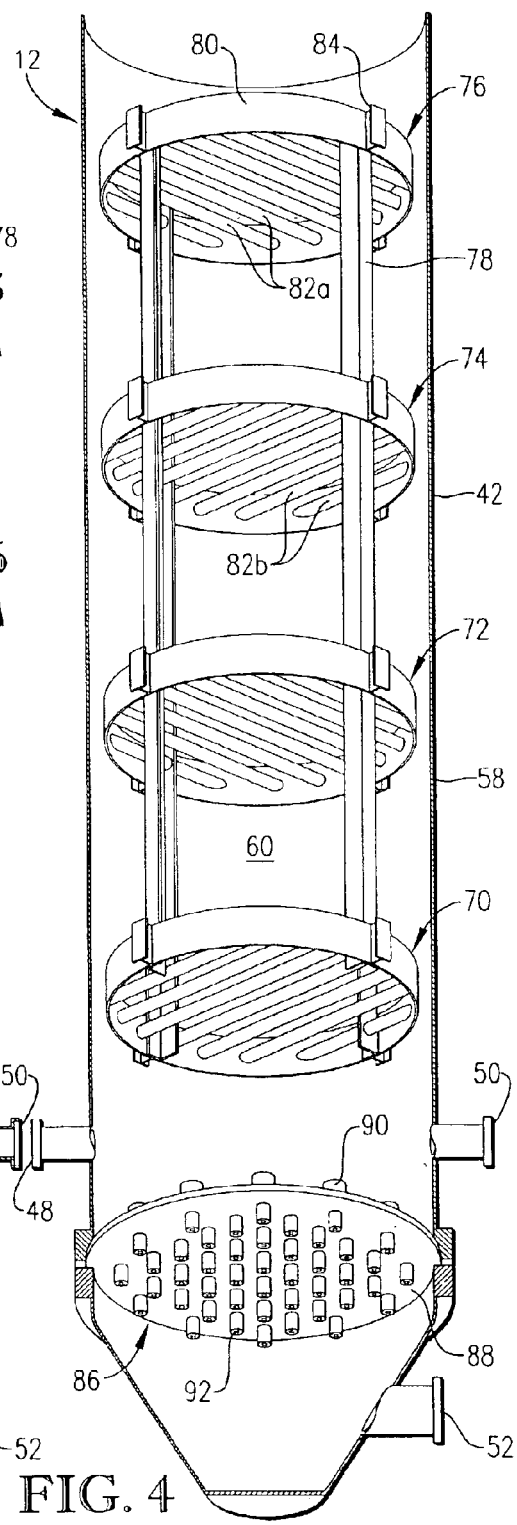
FIG. 4 is a partial isometric view of the fluidized bed reactor with certain portions of the reactor vessel being cut away to more clearly illustrate the orientation of the cross-hatched baffle groups in the reaction zone.
Figures 7, 8:
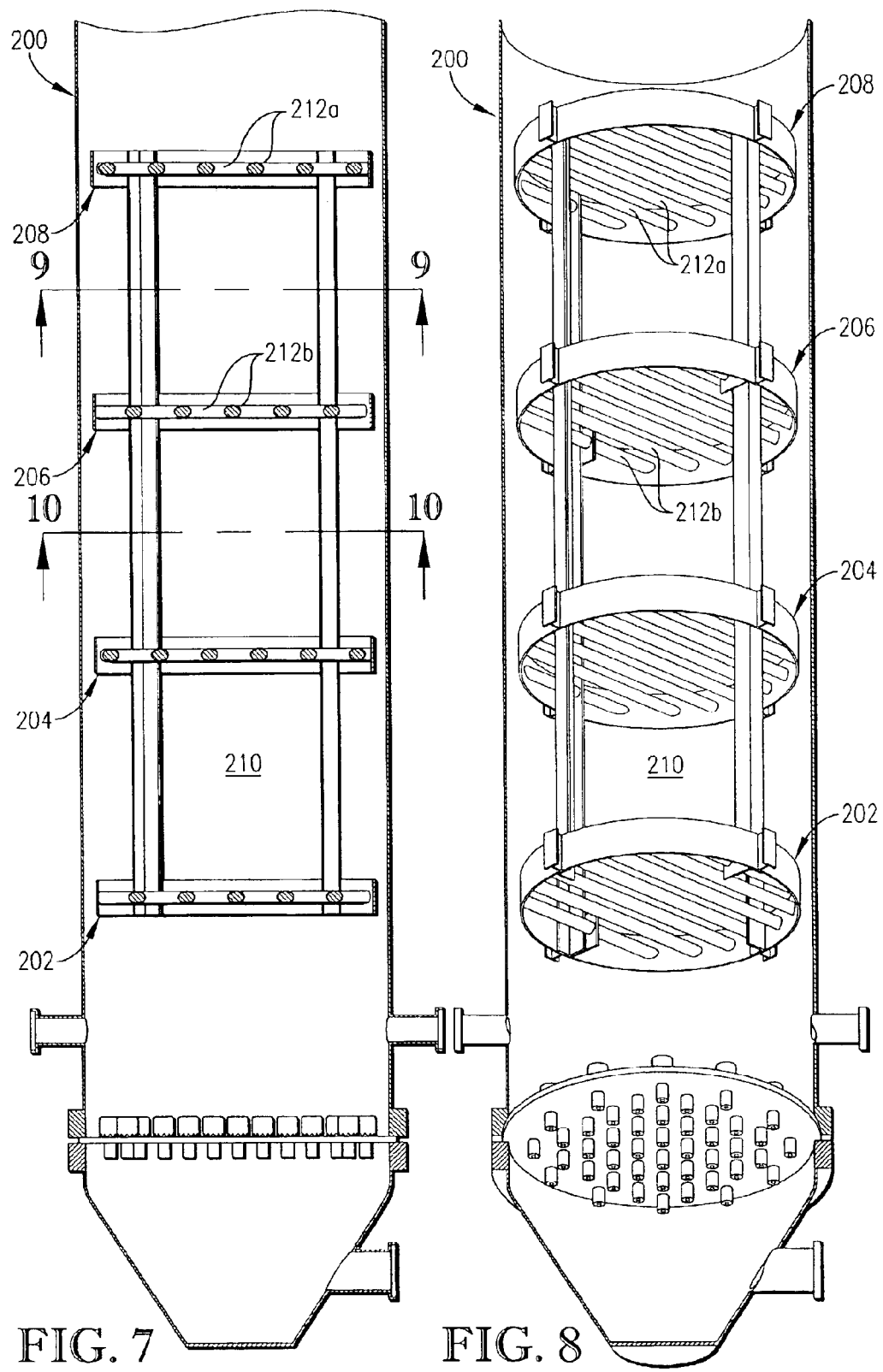
FIG. 7 is a partial sectional side view of an alternative fluidized bed reactor, particularly illustrating a series of vertically spaced staggered baffle groups disposed in the reaction zone.
FIG. 8 is a partial isometric view of the fluidized bed reactor of FIG. 7 with certain portions of the reactor vessel being cut away to more clearly illustrate the orientation of the staggered baffle groups in the reaction zone.
Figure 9:
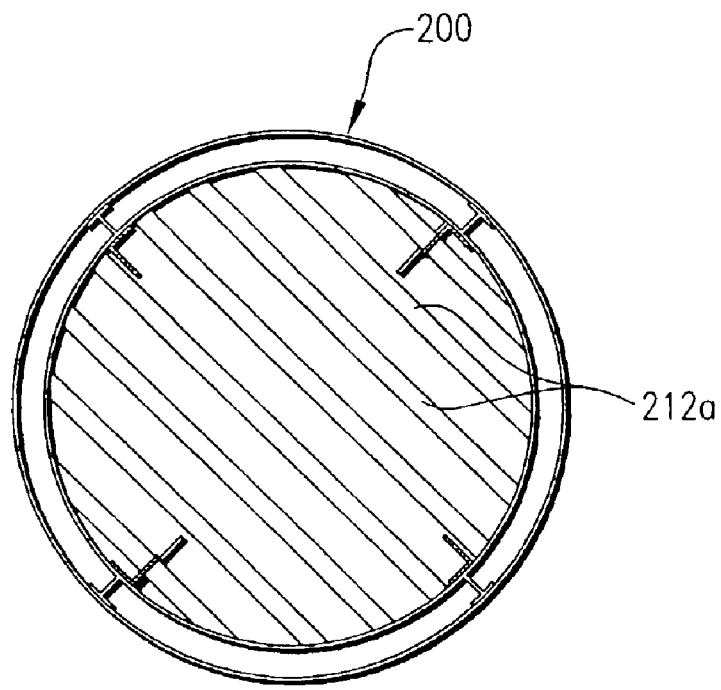
FIG. 9 is a sectional view of the fluidized bed reactor of FIG. 7 taken along line 9—9 in FIG. 7, particularly illustrating the construction of a single baffle group.
Figure 10:
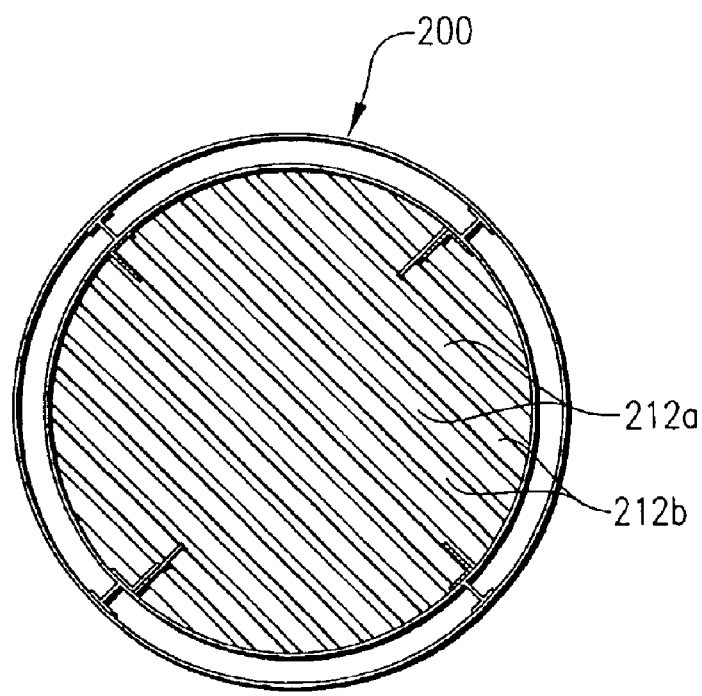
FIG. 10 is a sectional view of the fluidized bed reactor of FIG. 7 taken along line 10—10 in FIG. 7, particularly illustrating the staggered pattern created by the individual baffle members of adjacent baffle groups.

Referring to FIGS. 3 and 4, reactor 12 includes a series of generally horizontal, vertically spaced contact-enhancing baffle groups 70, 72, 74, 76 disposed in reaction zone 60. Baffle groups 70–76 are operable to minimize axial dispersion in reaction zone 60 when a fluid is contacted with solid particulates therein. Although FIGS. 3 and 4 show a series of four baffle groups 70–76, the number of baffle groups in reaction zone 60 can vary depending on the height and width of reaction zone 60. Preferably, two to ten vertically spaced baffle groups are employed in reaction zone 60, more preferably three to seven baffle groups are employed in reaction zone 60. The vertical spacing between adjacent baffle groups is preferably in the range of from about 0.02 to about 0.5 times the height of reaction zone 60, more preferably in the range of from about 0.05 to about 0.2 times the height of reaction zone 60, and most preferably in the range of from 0.075 to about 0.15 times the height of reaction zone 60. Preferably, the vertical spacing between adjacent baffle groups is in the range of from about 0.5 to about 6.0 feet, more preferably in the range of from about 1.0 to about 4.0 feet, and most preferably in the range of from 1.5 to 2.5 feet. The relative vertical spacing and horizontal orientation of baffle groups 70–76 is maintained by a plurality of vertical support members 78 which rigidly couple baffle groups 70–76 to one another.

Figure 5:
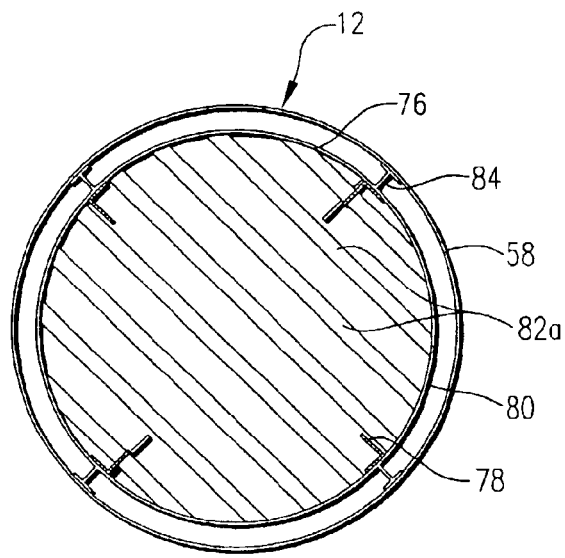
FIG. 5 is a sectional view of the fluidized bed reactor taken along line 5—5 in FIG. 3, particularly illustrating the construction of a single baffle group.

Referring now to FIG. 5, each baffle group 70–76 generally includes an outer ring 80 and a plurality of substantially parallelly extending, laterally spaced, elongated individual baffle members 82 coupled to and extending chordally within outer ring 80. Each individual baffle member 82 is preferably an elongated, generally cylindrical bar or tube. The diameter of each individual baffle member 82 is preferably in the range of from about 0.5 to about 5.0 inches, more preferably in the range of from about 1.0 to about 4.0 inches, and most preferably in the range of from 2.0 to 3.0 inches. Individual baffle members 82 are preferably laterally spaced from one another on about two to about ten inch centers, more preferably on about four to about eight inch centers. Each baffle group preferably has an open area between individual baffle members 82 which is about 40 to about 90 percent of the cross-sectional area of reaction zone 60 at the vertical location of that respective baffle group, more preferably the open area of each baffle group is about 55 to about 75 percent of the cross-sectional area of reaction zone 60 at the vertical location of that respective baffle group. Outer ring 80 preferably has an outer diameter which is about 75 to about 95 percent of the inner diameter of reactor section wall 58. A plurality of attachment members 84 are preferably rigidly coupled to the outer surface of outer ring 80 and are adapted to be coupled to the inner surface of reactor wall section 58, thereby securing baffle groups 70–76 to reactor section wall 58.

Figure 6:
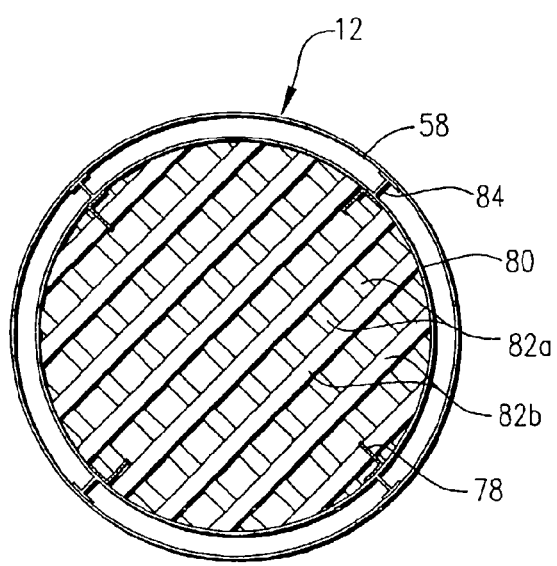
FIG. 6 is a sectional view of the fluidized bed reactor taken along line 6—6 in FIG. 3, particularly illustrating the cross-hatched pattern created by the individual baffle members of adjacent baffle groups.

Referring now to FIGS. 4 and 6, it is preferred for individual baffle members 82a,b of adjacent ones of baffle groups 70–76 to form a "cross-hatched" pattern when viewed from an axial cross section of reactor section 42 (see FIG. 6 which shows a vertical view of two adjacent baffle groups). Preferably, individual baffle members 82a,b of adjacent ones of baffle groups 70–76 extend transverse to one another at a cross-hatch angle in the range of from about 60 to about 120 degrees, more preferably in the range of from about 80 to about 100 degrees, still more preferably in the range of from about 85 to about 95 degrees, and most preferably substantially 90 degrees (i.e., substantially perpendicular). As used herein, the term "cross-hatch angle" shall denote the angle between the directions of extension of individual baffle members 82a,b of adjacent vertically spaced baffle groups 70–76, measured perpendicular to the longitudinal axis of the reaction zone 60.

Referring now to FIGS. 3 and 4, a distribution grid 86 is rigidly coupled to reactor 12 at the junction of plenum 40 and reactor section 42. Distribution grid 86 defines the bottom of reaction zone 60. Distribution grid 86 generally comprises a substantially disc-shaped distribution plate 88 and a plurality of bubble caps 90. Each bubble cap 90 defines a fluid opening 92 therein, through which the fluid entering plenum 40 through fluid inlet 52 may pass upwardly into reaction zone 60. Distribution grid 86 preferably includes in the range of from about 15 to about 90 bubble caps 90, more preferably in the range of from about 30 to about 60 bubble caps 90. Bubble caps 90 are operable to prevent a substantial amount of solid particulates from passing downwardly through distribution grid 86 when the flow of fluid upwardly through distribution grid 86 is terminated.

Referring to FIGS. 7 through 10, in an alternative embodiment of the present invention reactor 200 can include a series of generally horizontal, vertically spaced, horizontally staggered baffle groups 202, 204, 206, 208 disposed in reaction zone 210. As used herein, the term "horizontally staggered" shall denote a baffle configuration in which the positions of laterally spaced, substantially parallelly extending, elongated first individual baffles 212a of a first baffle group are horizontally shifted relative to the positions of laterally spaced, parallelly extending, elongated second individual baffles 212b of a second baffle group so that the first individual baffles 212a are substantially vertically centered in the gaps defined between in the second individual baffle members 212b. Baffle groups 202–208 are operable to reduce axial dispersion in reaction zone 210 when a fluid is contacted with solid particulates therein. The configuration of staggered baffle groups 202–208 is substantially similar to the configuration of the cross-hatched baffle groups (shown in FIGS. 3–6) described above; however, baffle groups 202–208 form a staggered pattern (shown in FIG. 10) rather than a cross-hatched pattern (shown in FIG. 6).

Although the particle size control and baffle systems for enhancing fluid/solids contacting are described herein as being employed in reactor 12, it is entirely within the ambit of the present invention for these systems to be employed in regenerator 14 and/or reducer 16, shown in FIG. 1.

The following examples are intended to be illustrative of the present invention and to teach one of ordinary skill in the art to make and use the invention. These examples are not intended to limit the invention in any way.

EXAMPLE 1

Figure 11:
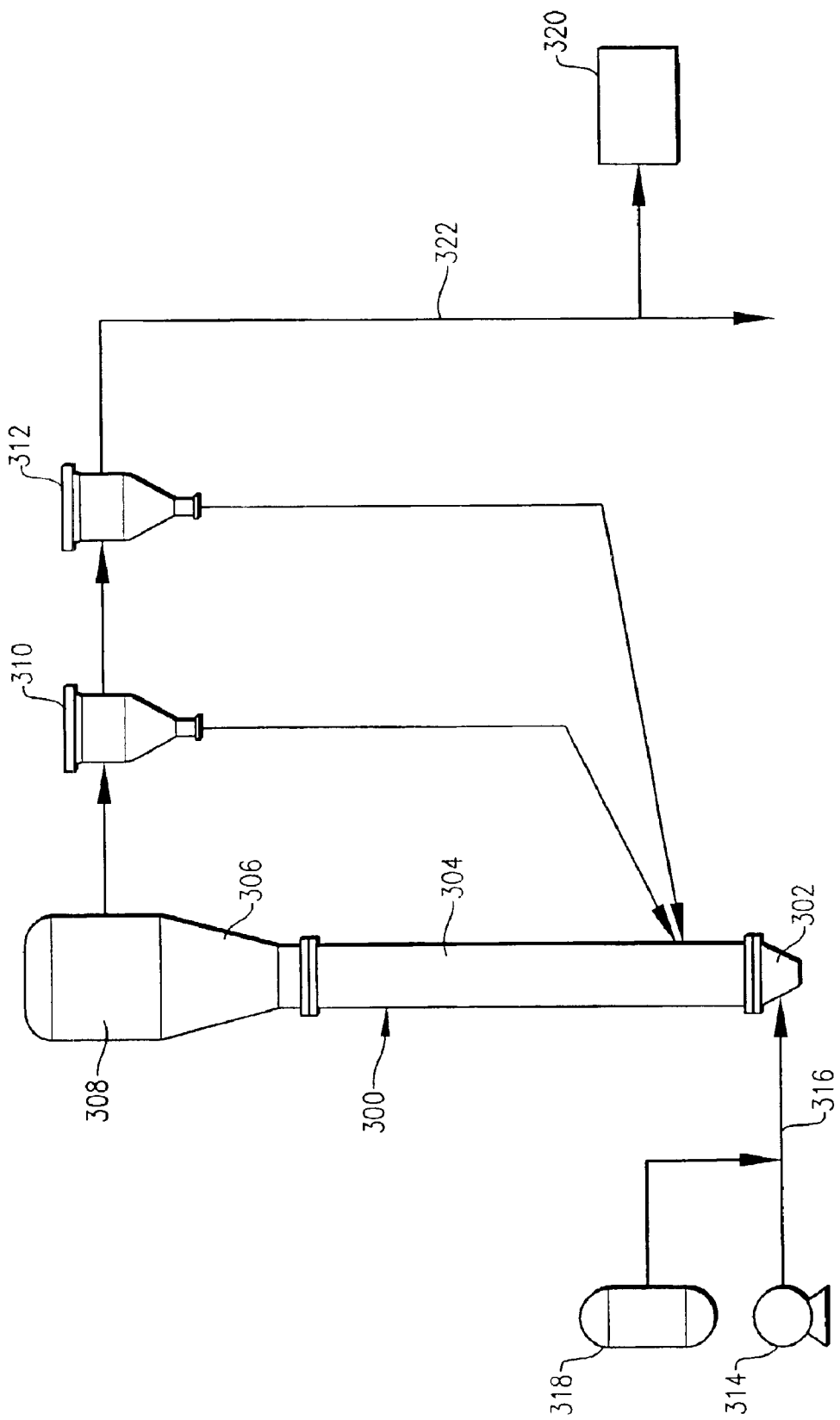
FIG. 11 is a schematic diagram of a full-scale fluidized bed test reactor system employed in tracer experiments for measuring fluidization characteristics in the reactor.

In order to test the hydrodynamic performance of the full-scale desulfurization reactor, a full-scale one-half round test reactor 300, shown in FIG. 11, was constructed. The test reactor 300 was constructed of steel, except for a flat Plexiglass™ face plate which provided visibility. The test reactor 300 comprised a plenum 302 which was 44 inches in height and expanded from 24 to 54 inches in diameter, a reactor section 304 which was 21 feet in height and 54 inches in diameter, an expanded section 306 which was 8 feet in height and expanded from 54 to 108 inches in diameter, and a dilute phase section 308 which was 4 feet in height and 108 inches in diameter. A distribution grid having 22 holes was positioned in reactor 300 proximate the junction of the plenum 302 and the reactor section 304. The test reactor 300 also included primary and secondary cyclones 310, 312 that returned solid particulates to approximately one foot above the distribution grid. Fluidizing air was provided to plenum 302 from a compressor 314 via an air supply line 316. The flow rate of the air charged to reactor 300, in actual cubic feet per minute, was measured using a Pitot tube. During testing, flow conditions were adjusted to four target gas velocities in reactor section 304 including 0.75, 1.0, 1.5, and 1.75 ft/s. Solid particulates were loaded in the reactor 300 from an external hopper, which was loaded from particulate storage drums. Fluidized bed heights (nominally 4, 7, and 12 feet) were achieved by adding or withdrawing solid particulates.

A first set of tracer tests was conducted in order to compare the degree of axial dispersion in the reactor 300 when sets of cross-hatched horizontal baffle members were employed in the reactor versus no internal baffles. During the first set of tracer tests with horizontal baffles, five vertically spaced horizontal baffle members were positioned in the reactor. Each baffle member (shown in FIG. 5) included a plurality of parallel cylindrical rods. The cylindrical rods had a diameter of 2.375 inches and were spaced from one another on six inch centers. The spacing of the rods gave each baffle member an open area of about 65%. The baffle members were vertically spaced in the reactor 300 two feet from one another and each baffle member was rotated relative to the adjacent baffle member so that the cylindrical rods of adjacent, vertically spaced baffle members extended substantially perpendicular to one another, thereby creating a generally cross-hatched baffle pattern (shown in FIG. 6).

The tracer tests were conducted by injecting methane (99.99% purity) from vessel 318 into the reactor 300 as a non-absorbing tracer. The methane was injected as a 120 cc pulse into a sample loop. The loop was pressurized to about 40 psig. After filling the loop for two minutes, the sample was injected by sweeping the loop with air flowing at about 10 SCF/hr. As shown in FIG. 11, the methane was injected into the air supply line 316 used to bring fluidizing air into the plenum 302.

A Foxboro Monitor Model TN-1000 analyzer 320 was used to measure the outlet concentration of methane supply over time to thereby yield the residence time distribution of methane in the reactor 300. The analyzer 320 had dual detectors, including a flame ionization detector (FID) and a photo-ionization detector (PID), and sampled at a rate of one measurement per second. The FID was used to detect methane. Methane was sampled from the exhaust line 322, as shown in FIG. 11. Although it was preferred to sample the methane directly above the fluidized bed of solid particulates, in such a configuration particulate fines could not effectively be excluded from the sample line and clogged the filter within the analyzer 320. Data were collected electronically by the analyzer 320, and after the experiment was completed, these data were transferred to a personal computer. Sampling lasted between three and four minutes, depending on the gas velocity and the catalyst bed height, until the tracer gas concentration returned to baseline.

To indicate axial dispersion in reactor 300 the outlet concentration of methane from the reactor 300 was measured as a function of time. In other words, a residence time distribution curve or tracer curve was measured for a pulse of methane. For small deviations from plug flow, where the Peclet number is greater than about 200, the tracer curve is narrow and appears symmetrical and gaussian. For Peclet numbers less than 100, the tracer curve is broad and passes slowly enough that it changes shape and spreads to create a non-symmetrical curve. In all of the methane tracer tests, the residence time distribution curve was spread and non-symmetrical. The spread for variance of these curves were translated into Peclet numbers.

In order to determine the Peclet number from the measured peak variance and measured mean residence time, a "closed system" model was employed. In such a closed system, it was assumed that the methane gas moved in plug flow before and after the fluidized bed so that gas axial dispersion is due only to the fluidized solid particulates. For a closed system, the Peclet number is related to variance and mean residence time in the following equation:

$$\frac{\sigma^2}{\bar{t}^2} = 2(1/Pe)^2[1 - \exp(-Pe)].$$

In this equation, $\sigma^2$ is the variance and $\bar{t}^2$ is the square of the mean residence time. Thus, calculation of the Peclet number depends on the calculation of these two parameters. The mean residence time is the center of gravity in time and can be determined from the following equation, where the denominator is the area under the curve:

$$\bar{t} = \frac{\int_0^\infty tC dt}{\int_0^\infty C dt}.$$

The variance tells how spread out in time the curve is, and is determined from the following equation:

$$\sigma^2 = \frac{\int_0^\infty t^2 C dt}{\int_0^\infty C dt} - \bar{t}^2.$$

If the data points are numerous and closely spaced, the mean time and variance can be estimated from the following equations:

$$\bar{t} = \frac{\sum_i t_i C_i \Delta t_i}{\sum_i C_i \Delta t_i} = \frac{\sum_i t_i C_i}{\sum_i C_i}$$

$$\sigma^2 = \frac{\sum_i t_i^2 C_i \Delta t_i}{\sum_i C_i \Delta t_i} - \bar{t}^2 = \frac{\sum_i t_i^2 C_i}{\sum_i C_i} - \bar{t}^2.$$

Since the methane is sampled downstream of the fluidized bed, the residence time distribution curve of the methane can include contributions to peak variance and time from volumes which are located downstream of the catalyst bed and upstream of the analyzer 320. Fortunately, variances and time are additive, as long as the contributions to peak variance and time occurring in one vessel are independent of the other vessels. Thus, the total variance and total mean time is simply the sum of the variances and mean time attributable to the individual volumes and can be expressed as follows:

$$\sigma^2_{total} = \sigma^2_{catalyst} + \sigma^2_{expanded\ section} + \sigma^2_{cyclones/tubing} + \sigma^2_{sampling}$$

$$\bar{t}_{total} = \bar{t}_{catalyst} + \bar{t}_{expanded\ section} + \bar{t}_{cyclones/tubing} + \bar{t}_{sampling}$$

Special injection experiments were made to measure the variance and time due to sampling, the expanded section 306, the volume of the cyclones 310, 312, and the volume of the tubing. The results of these experiments could then be subtracted from the total variance and mean time to obtain the values due only to the catalyst.

Table 6 summarizes the calculated Peclet number results for the first set of tracer tests employing fine solid particulates at different bed heights, with and without perpendicular horizontal baffles (HBs) in the reactor.

TABLE 6

| | | No HBs | | 5 Perpendicular HBs | |
|---|---|---|---|---|---|
| Bed Ht. (ft) | Target $U_o$ (ft/s) | Measured $U_o$ (ft/s) | Peclet Number | Measured $U_o$ (ft/s) | Peclet Number |
| 11 | 0.75 | 0.86 | 2.00 | 0.92 | 9.50 |
| 11 | 1.00 | 1.12 | 2.30 | 1.16 | 18.80 |
| 11 | 1.50 | 1.48 | 2.30 | 1.47 | 11.80 |
| 11 | 1.75 | 1.74 | 1.80 | 1.65 | 20.70 |
| 7 | 0.75 | 0.82 | 11.70 | 0.90 | 19.10 |
| 7 | 1.00 | 1.12 | 13.90 | 1.15 | 22.70 |
| 7 | 1.50 | 1.47 | 14.10 | 1.43 | 21.10 |
| 7 | 1.75 | 1.74 | 12.70 | 1.71 | 19.10 |

Table 7 summarizes the calculated Peclet number results for the first set of tracer tests employing coarse solid particulates, with and without perpendicular HBs in the reactor.

TABLE 7

| | | No HBs | | 5 Perpendicular HBs | |
|---|---|---|---|---|---|
| Bed Ht. (ft) | Target $U_o$ (ft/s) | $U_o$ at Bed Surface (ft/s) | Peclet Number | Measured $U_o$ (ft/s) | Peclet Number |
| 11 | 0.75 | 0.83 | 6.9 | 0.93 | 8.8 |
| 11 | 1.00 | 1.18 | 6.2 | 1.15 | 10.0 |
| 11 | 1.50 | 1.45 | 6.0 | 1.49 | 9.3 |
| 11 | 1.75 | 1.65 | 6.0 | 1.71 | 10.2 |

Table 8 summarizes the properties of the coarse and fine solid particulates employed in the tracer tests.

TABLE 8

| Property | "Fine" Particulates | "Coarse" Particulates |
|---|---|---|
| $\rho_s$, g/cm$^3$ (He displacement) | 2.455 | 2.379 |
| $\rho_p$, g/cm$^3$ | 0.973 | 1.075 |
| $\rho_B$, g/cm$^3$ | 0.805 | 0.807 |
| Pore Volume, mL/g (Hg intrusion) | 0.62 | 0.51 |
| Al$_2$O$_3$, wt % | 49 | 49 |
| Moisture (LOI), wt % | 31.54 | 24.09 |
| Davison Index (DI) | 7.08 | 7.74 |
| $d_{sv}$, microns | 51 | 60 |
| 0–20 microns, wt % | 2.40 | 0.47 |
| 0–40 microns, wt % | 26.74 | 14.44 |
| Particle Size Distribution | | |
| >212 microns | 0 | 0 |
| 212–180 microns | 0 | 0 |
| 180–106 microns | 4.54 | 10.04 |
| 106–90 microns | 5.87 | 9.52 |
| 90–45 microns | 53.94 | 59.48 |
| 45–38 microns | 12.48 | 9.14 |
| <38 microns | 23.17 | 11.82 |

TABLE 8-continued

| Property | "Fine" Particulates | "Coarse" Particulates |
|---|---|---|
| Geldart Classification | A | A |
| Fluidity Index | 5.39 | 3.88 |
| $U_{mf}$, cm/s (calculated) | 0.08 | 0.13 |

The results provided in Tables 6 and 7 demonstrated that axial dispersion was dramatically reduced (as indicated by the increased Peclet number) when five perpendicular (i.e., cross-hatched) horizontal baffles were added to the reaction section 304 of the fluidized bed reactor 300.

EXAMPLE 2

In this example, a second set of tracer tests was conducted in substantially the same manner as the first set of tracer tests, described in Example 1. However, the cross-hatched (i.e., perpendicular) baffle arrangement described in Example 1 and shown in FIGS. 3–6 was replaced with a staggered baffle arrangement shown in FIGS. 7–10. During the second set of tracer tests, five vertically spaced horizontal baffle members were positioned in the reactor. Each baffle member (shown in FIG. 9) included a plurality of parallel cylindrical rods. The cylindrical rods had a diameter of 2.375 inches and were spaced from one another on six inch centers. The spacing of the rods gave each baffle member an open area of about 65%. The baffle members were vertically spaced in the reactor 300 two feet from one another and each baffle member was offset relative to the adjacent baffle member so that the cylindrical rods of adjacent, vertically spaced baffle members extended substantially parallel to one another and were horizontally staggered (see FIG. 10).

Table 9 summarizes the calculated Peclet number results for the second set of tracer tests employing the fine solid particulates at different bed heights, with and without staggered horizontal baffles (HBs) in the reactor 300.

TABLE 9

| | | No HBs | | 5 Staggered HBs | |
|---|---|---|---|---|---|
| Bed Ht. (ft) | Target $U_o$ (ft/s) | Measured $U_o$ (ft/s) | Peclet Number | Measured $U_o$ (ft/s) | Peclet Number |
| 11 | 0.75 | 0.86 | 2.00 | 0.83 | 15.20 |
| 11 | 1.00 | 1.12 | 2.30 | 1.09 | 16.60 |
| 11 | 1.50 | 1.48 | 2.30 | 1.46 | 14.50 |
| 11 | 1.75 | 1.74 | 1.80 | 1.67 | 16.80 |
| 7 | 0.75 | 0.82 | 11.70 | 0.84 | 14.30 |
| 7 | 1.00 | 1.12 | 13.90 | 1.13 | 19.90 |
| 7 | 1.50 | 1.47 | 14.10 | 1.49 | 24.20 |
| 7 | 1.75 | 1.74 | 12.70 | 1.77 | 24.20 |

Table 10 summarizes the calculated Peclet number results for the second set of tracer tests employing the coarse solid particulates, with and without staggered HBs in the reactor 300.

TABLE 10

| | | No HBs | | 5 Staggered HBs | |
|---|---|---|---|---|---|
| Bed Ht. (ft) | Target $U_o$ (ft/s) | $U_o$ at Bed Surface (ft/s) | Peclet Number | Measured $U_o$ (ft/s) | Peclet Number |
| 11 | 0.75 | 0.83 | 6.9 | 0.85 | 7.1 |
| 11 | 1.00 | 1.18 | 6.2 | 1.11 | 7.0 |
| 11 | 1.50 | 1.45 | 6.0 | 1.49 | 6.2 |
| 11 | 1.75 | 1.65 | 6.0 | 1.71 | 6.7 |

The results provided in Tables 9 and 10 demonstrated that axial dispersion was dramatically reduced (as indicated by the increased Peclet number) when five staggered horizontal baffles were added to the reaction section 304 of the fluidized bed reactor 300.

EXAMPLE 3

In this example, a third set of tracer tests was conducted in substantially the same manner as the first and second sets of tracer tests, described in Examples 1 and 2. However, the third set of tracer tests were conducted to evaluate the impact of particle size on axial dispersion in reactor 300.

Table 11 summarizes the calculated Peclet number results for the third set of tracer tests employing the fine and the coarse solid particulates (described in Table 8) in reactor 300 having five horizontal staggered baffles (described in Example 2).

TABLE 11

| | | Coarse Catalyst | | Fine Catalyst | |
|---|---|---|---|---|---|
| Bed Ht. (ft) | Target $U_o$ (ft/s) | $U_o$ at Bed Surface (ft/s) | Peclet Number | Measured $U_o$ (ft/s) | Peclet Number |
| 11 | 0.75 | 0.85 | 7.1 | 0.83 | 15.2 |
| 11 | 1.00 | 1.11 | 7.0 | 1.09 | 16.6 |
| 11 | 1.50 | 1.49 | 6.2 | 1.46 | 14.5 |
| 11 | 1.75 | 1.71 | 6.7 | 1.67 | 16.8 |
| 4 | 0.75 | 0.81 | 13.7 | 0.88 | 22.7 |
| 4 | 1.00 | 1.07 | 14.5 | 1.09 | 25.0 |
| 4 | 1.50 | 1.54 | 16.2 | 1.49 | 28.1 |
| 4 | 1.75 | 1.73 | 15.6 | 1.71 | 22.3 |

Table 12 summarizes the calculated Peclet number results for the third set of tracer tests employing the fine and the coarse solid particulates (described in Table 8) in reactor 300 having five horizontal cross-hatched baffles (described in Example 1).

TABLE 12

| | | Coarse Catalyst | | Fine Catalyst | |
|---|---|---|---|---|---|
| Bed Ht. (ft) | Target $U_o$ (ft/s) | $U_o$ at Bed Surface (ft/s) | Peclet Number | Measured $U_o$ (ft/s) | Peclet Number |
| 11 | 0.75 | 0.93 | 8.8 | 0.92 | 9.5 |
| 11 | 1.00 | 1.15 | 10.0 | 1.16 | 18.8 |
| 11 | 1.50 | 1.49 | 9.3 | 1.47 | 11.8 |
| 11 | 1.75 | 1.71 | 10.2 | 1.65 | 20.7 |

The results provided in Tables 11 and 12 demonstrate that particle size had a significant impact on axial dispersion, with axial dispersion being reduced (as indicated by the increased Peclet numbers) when the fine solid particulates, having a smaller mean particle size and a larger fines content, was employed verses the coarse solid particulates.

Reasonable variations, modifications, and adaptations maybe made within the scope of this disclosure and the appended claims without departing from the scope of this invention.

That which is claimed is:

1. A sorbent composition comprising:
   a plurality of solid sorbent particulates having a mean particle size in the range of from about 50 to about 70 microns and a fines content of at least about 10 weight percent, wherein each of said particulates comprises zinc oxide and a reduced-valence promoter metal component.

2. A sorbent composition according to claim 1, wherein each of said sorbent particulates comprises said zinc oxide in an amount in the range of from about 5 to about 80 weight percent and said reduced-valence promoter metal component in an amount in the range of from about 5 to about 80 weight percent.

3. A sorbent composition according to claim 2, wherein said reduced-valence promoter metal component comprises a promoter metal selected from the group consisting of nickel, cobalt, iron, manganese, tungsten, silver, gold, copper, platinum, zinc, ruthenium, molybdenum, antimony, vanadium, iridium, chromium, and palladium.

4. A sorbent composition according to claim 3, wherein said promoter metal is nickel.

5. A sorbent composition according to claim 4, wherein each of said sorbent particulates has a particle density in the range of from about 0.5 to about 1.5 g/cc.

6. A sorbent composition according to claim 1, wherein said solid sorbent particulates have a mean particle size in the range of from about 50 to about 65 microns and a fines content of at least about 15 weight percent.

7. A sorbent composition according to claim 6, wherein said reduced-valence promoter metal component comprises a substitutional solid metal solution characterized by the formula $M_A Zn_B$, wherein M is a promoter metal and A and B are each numerical values in the range of 0.01 to 0.99.

8. A sorbent composition according to claim 7, wherein said sorbent particulates comprise said substitutional solid metal solution in an amount in the range of from about 20 to about 60 weight percent and said zinc oxide in an amount in the range of from about 20 to about 60 weight percent.

9. A sorbent composition according to claim 8, wherein said promoter metal is selected from the group consisting of nickel, cobalt, iron, manganese, tungsten, silver, gold, copper, platinum, zinc, ruthenium, molybdenum, antimony, vanadium, iridium, chromium, and palladium, and wherein A is in the range of from about 0.70 to about 0.97 and B is in the range of from about 0.03 to about 0.30.

10. A sorbent composition according to claim 9, wherein said promoter metal is nickel.

11. A sorbent composition according to claim 10, wherein each of said sorbent particulates has a particle density in the range of from about 0.8 to about 1.3 g/cc.

12. A sorbent composition according to claim 11, wherein each of said solid sorbent particulates comprises an aluminate.

13. A sorbent composition according to claim 12, wherein each of said solid sorbent particulates comprises perlite.

14. A sorbent composition comprising:
   a plurality of solid sorbent particulates having a mean particle size in the range of from about 50 to about 70 microns and a fines content of at least about 10 weight percent, wherein each of said particulates comprises zinc oxide, an aluminate, perlite, and a promoter metal component.

15. A sorbent composition according to claim 14, wherein each of said solid sorbent particulates comprises said zinc oxide in an amount in the range of from about 5 to about 80 weight percent, said aluminate in an amount in the range of from about 1 to about 50 weight percent, said perlite in an amount in the range of from about 2 to about 50 weight percent, and said promoter metal component in an amount in the range of from about 5 to about 80 weight percent.

16. A sorbent composition according to claim 15, wherein said promoter metal component comprises a promoter metal selected from the group consisting of nickel, cobalt, iron, manganese, tungsten, silver, gold, copper, platinum, zinc, ruthenium, molybdenum, antimony, vanadium, iridium, chromium, and palladium.

17. A sorbent composition according to claim 16, wherein said aluminate comprises said promoter metal.

18. A sorbent composition according to claim 17, wherein said aluminate comprises zinc.

19. A sorbent composition according to claim 18, wherein said aluminate comprises a promoter metal-zinc aluminate substitutional solid solution characterized by the formula $M_Z Zn_{(1-Z)} Al_2 O_4$ wherein M is said promoter metal and Z is a numerical value in the range of from 0.01 to 0.99.

20. A sorbent composition according to claim 19, wherein said promoter metal component comprises a substitutional solid metal solution characterized by the formula $M_A Zn_B$, wherein M is said promoter metal and A and B are each numerical values in the range of from 0.01 to 0.99.

21. A sorbent composition according to claim 20, wherein said promoter metal component is nickel, and wherein A is in the range of from about 0.70 to about 0.97 and B is in the range of from about 0.03 to about 0.30.

22. A sorbent composition according to claim 21, wherein said solid sorbent particulates have a mean particle size in the range of about 50 to about 65 microns and a fines content of at least about 15 weight percent.

* * * * *